(12) United States Patent
Tripe

(10) Patent No.: X681
(45) Date of Patent: Apr. 1, 1806

(54) DIVING MACHINE

(76) Inventor: Richard Tripe

Richard [illegible] Patented April 1st 1806

Letters Patent.

The Schedule referred to in these Letters Patent & making part of the same containing a Description in the words of the said Richard [illegible] himself of his Improvement in a Diving Machine.

To prevent the exhausting of the air, and to prevent its weight, resistance and elasticity entire for any given period, which by ordinary means could not have been effected, a pipe, Tube or cylinder of from [illegible] to [illegible] inch Diameter, which extending any Distance above the surface of the water to answer emergencies, as it respects depth of water, must pass the outer edge of the machine when immersed, & pass into the same near the top, where a Cock is placed to introduce or impede the current of air. On the Gondola, which sustains the whole machine, a pair of large Bellows are constructed, whose nose or Snout is inserted into the air-pipe, the upper end of which is made fast with a proper cap or Stopper, which (Bellows) when worked forces the air down in such quantities as not only to supply the Diver — — —
— sufficiency for the purposes — — — — — — — — — —
whole mass of water from the inside of the machine. By these means the machine is carried to the bottom, proper weights being attached thereto for that purpose. The machine is constructed of wood, hooped with Iron & to the [illegible] [illegible] Light is effected by shells or squares of [illegible] Glass inserted into the sides of the machine. The machine is hoisted or lowered by means of a main fall, which fastens to a Crabb or Capstan on the Gondola, passes through the top of the Frame and is made fast to the same machine. Signal lines are extended from the inside of the machine to the surface of the water,
or to any further Distance. To keep the machine sta-
tionary Iron + Braces are made fast to the top of the
same and extend to the Gondola, or to any distance a-
bove it. The Tube or Pipe from the inside of the Machine
to two, or three feet on the outside is constructed of hard
metal. the remainder of thick water-proof Leather.

Witnesses.
Moses L. Neal
John Rivers

Richard Tripe.

Received and Recorded anew Janua-
ry 5th 1870 - from the original Patent.

C.d.
P.A.C.